United States Patent [19]

Nolin

[11] 4,304,111

[45] Dec. 8, 1981

[54] STEERING WHEEL CROSS LOCK (ANTI-THEFT)

[76] Inventor: James F. Nolin, 428 E. 123 St., Cleveland, Ohio 44108

[21] Appl. No.: 90,652

[22] Filed: Nov. 2, 1979

[51] Int. Cl.³ .................... B60R 25/02; E05B 17/14; E05B 65/12; E05B 73/00
[52] U.S. Cl. .................................... 70/212; 70/18; 70/238; 70/424; 70/428
[58] Field of Search ................ 70/212, 238, 237, 423, 70/18, 424, 164, 166

[56] References Cited

U.S. PATENT DOCUMENTS

| | | | |
|---|---|---|---|
| 1,193,737 | 8/1916 | Thomas | 70/212 |
| 1,218,856 | 3/1917 | Gulden | 70/212 X |
| 1,401,971 | 1/1922 | Faison | 70/18 X |
| 1,588,421 | 6/1926 | Holland | 70/212 |
| 3,401,543 | 9/1968 | Lewis | 70/237 UX |
| 3,886,770 | 6/1975 | Smith | 70/8 |
| 4,008,589 | 2/1977 | Harrell | 70/237 X |
| 4,118,961 | 10/1978 | Lee | 70/237 |

FOREIGN PATENT DOCUMENTS

| | | | |
|---|---|---|---|
| 611262 | 3/1935 | Fed. Rep. of Germany | 70/212 |
| 459690 | 11/1913 | France | 70/18 |
| 2370622 | 7/1978 | France | 70/18 |
| 1167867 | 10/1969 | United Kingdom | 70/238 |

Primary Examiner—Francis K. Zugel
Assistant Examiner—Carl F. Pietruszka

[57] ABSTRACT

A cup with a saddle-shaped open end fits on a steering column over the ignition switch and forms a support bracket for the ends of a cross-chain of T-configuration, whereby one chain portion goes from one side of the cup around the column and the second chain portion goes from the crossing first portion over a steering wheel spoke, both chain portions ending at and lockably securable to the other side of the cup, to provide a removable device for securement of both the ignition switch and the steering wheel of the motor vehicle.

2 Claims, 2 Drawing Figures

STEERING WHEEL CROSS LOCK (ANTI-THEFT)

This invention relates to automotive anti-theft devices. Most modern cars today are equipped with a soft metal or plastic band around the steering column which can be torn or pried open with a sharp instrument or screwdriver which then exposes the wires to release the gearshift and/or unlocks the ignition, thereby giving a thief complete control to operate an automotive vehicle which would be at his total disposal. This is especially true in cars that have a tilted steering wheel.

It is well known today that a thief can insert a sharp instrument or screwdriver into the soft metal or plastic band, above or below the ignition switch, on the steering column. If a cross-chain is secured over the cross bar (horn), then the thief cannot drive the vehicle provided the cross chain is secured and the car wheels are turned clockwise.

In this late date and time, thieves do not have to go through the ignition switch to gain access to the necessary wires to release the connections to start or release the engine of an automotive vehicle.

Also, if a thief should tamper with the secured cross-chain, the horn would sound, thereby drawing attention before extensive damage could be done to the vehicle.

Decorative felt material and/or plastic can be implemented to cover the cross-chain so as to prevent any minor scratching from occuring to the steering wheel and/or steering column.

A metal cup-like backet is attached to the cross chain, which will fit around the ignition switch to prevent the cross-chain from movement in connection with the steering wheel of a vehicle.

BRIEF DESCRIPTION OF VIEWS OF DRAWINGS

FIG. 1 is an isometric perspective view showing the protection position of the steering wheel, steering column, support bracket and cross-chain wherein said cross-chain prevents a thief from steering said vehicle, even though the vehicle may be in gear or the engine on.

DETAILED DESCRIPTION

Figure 1:
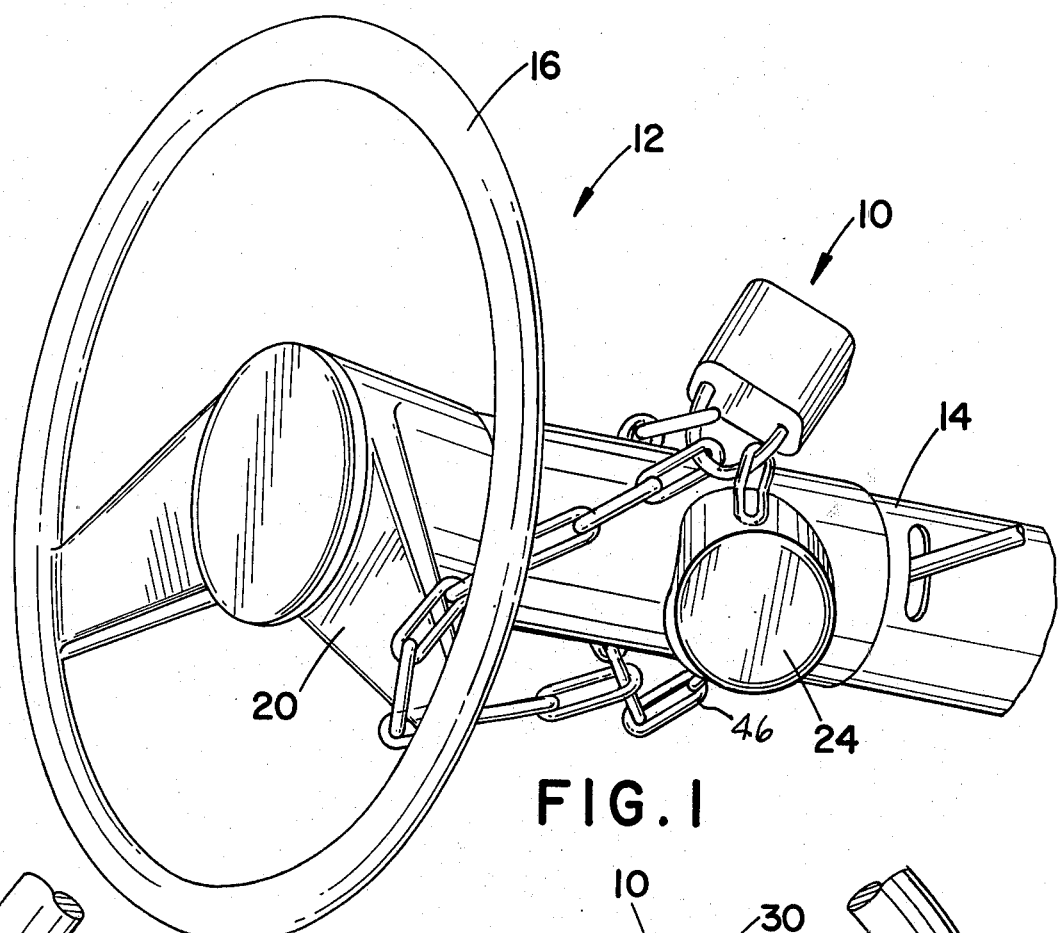
Figure 2:
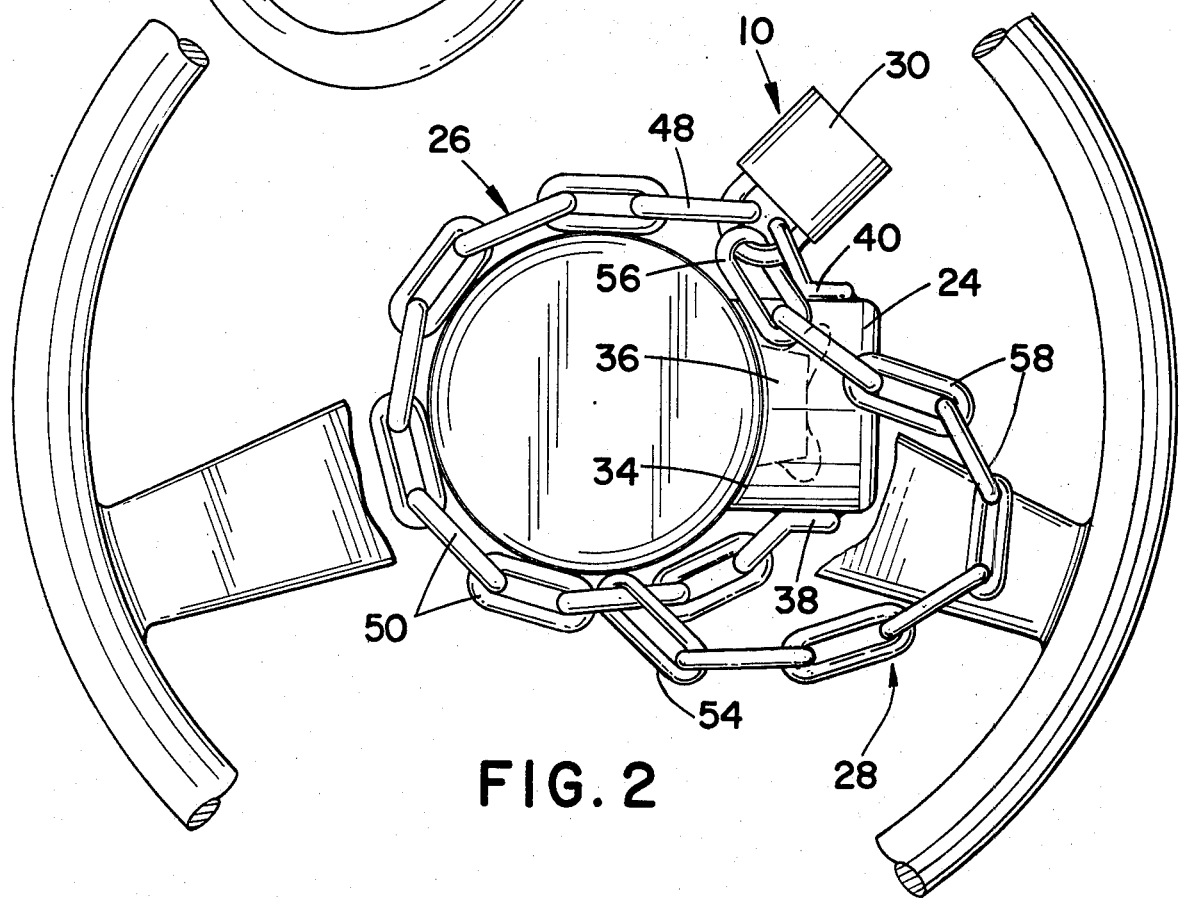
FIG. 2 shows a top perspective view of the steering wheel cross lock specifically, the support bracket and cross-chain and heavy duty padlock.

Referring now to the drawings wherein the showings are for purposes of illustrating the preferred embodiment of the invention only and not for purposes of limiting same, the Figures show a steering wheel cross lock 10 mounted upon and locking a steering column 12 comprised of a steering post 14 and a steering wheel 16. The steering column can be any conventional steering column and can include a tiltable steering post. The steering wheel 16 preferably comprises one which includes at least one spoke 20 (usually with horn actuator).

The new steering wheel cross lock is comprised of a cup or support bracket 24, a short chain 26, a long chain 28 and means for locking the cup 24 and chains 26, 28 together, such as heavy padlock 30.

Cup 24 includes a saddle-shaped open end 34 for enclosure of ignition switch 36 as cup 24 is in close abutment with generally cylindrical steering post 14. Cup 24 also includes a first eye link 38 and a second eye link 40. Eye links 38, 40 preferably comprise angulated chain links which are secured to the outer side wall surfaces of cup 24 in a conventional manner such as by welding.

Short chain 26 is comprised of a short chain first end link 46, a short chain second end link 48 and a plurality of identical intermediate short chain links 50. The short chain first end link 46 is secured to the first eye link 38 of cup 24. The short chain 28 is dimensioned to encompass the steering post 14 such that when short chain second end link 48 is locked to second eye link 40 with padlock 30, cup 24 effectively enclose ignition switch 36 to prevent tampering with the switch.

Long chain 28 comprises a long chain first end link 54, a long chain second end link 56 and a plurality of identical long chain intermediate links 58. Long chain first end link is secured to a link of the short chain 26, such as a short chain intermediate link 50 or short chain first end link 46, to form a tee shape or cross. Long chain 28 is dimensioned to pass around at least one wheel spoke 20 of steering wheel 16 and then secured with long chain second end link 56 to padlock 30, short chain second end link 48, and second eye link 40.

The cup 24, short chain 26 and long chain 28 can all be enclosed in a decorative material, such as plastic or felt to improve the aesthetic appearance of the invention while preventing scratches or nicks to the steering column during installation and removal of the invention.

I claim:

1. A steering wheel cross lock for locking a steering column of a motor vehicle comprising:
    a rigid cup having a saddle-shaped open end and including a first eye link and a second eye link secured to said cup on opposite outer side wall surfaces of said cup, said cup being adapted to enclose an ignition switch on said steering column;
    a short chain comprising a short chain first end link, a short chain second end link and a plurality of intermediate short chan links, said short chain first end link being secured to said first eye link of said cup, said short chain being adapted to encompass a steering post of said steering column;
    a long chain comprising a long chain first end link, a long chain second end link and a plurality of intermediate long chain links, said long chain first end link being secured to one of said short chain links, and said long chain being adapted to pass around a spoke of a steering wheel of said steering column; and,
    selective locking means for selectively securing said short chain second end link and said long chain second end link to said second eye link of said cup whereby upon said selectively securing, said ignition switch is enclosed and said steering wheel is locked against turning to inhibit theft of said motor vehicle.

2. The steering wheel cross lock as described in claim 1 wherein said selective locking means comprises a padlock.

* * * * *